US008173189B2

(12) United States Patent
Chua

(10) Patent No.: US 8,173,189 B2
(45) Date of Patent: May 8, 2012

(54) MAGNETIC DEVICE AND METHOD FOR TREATING PERISHABLE ITEMS SUCH AS FOOD OR ICE

(75) Inventor: Loh You Chua, Singapore (SG)

(73) Assignee: Esmo Technologies Pte Ltd, Singapore (SG)

( * ) Notice: Subject to any disclaimer, the term of this patent is extended or adjusted under 35 U.S.C. 154(b) by 1089 days.

(21) Appl. No.: 11/831,312

(22) Filed: Jul. 31, 2007

(65) Prior Publication Data

US 2007/0292571 A1 Dec. 20, 2007

Related U.S. Application Data

(63) Continuation-in-part of application No. PCT/SG2006/000018, filed on Feb. 1, 2006.

(51) Int. Cl.
*A47J 31/00* (2006.01)
(52) U.S. Cl. ........... 426/237; 99/451; 206/818; 210/222
(58) Field of Classification Search ............. 99/451, 99/422, 426, 403; 426/237; 206/818; 210/222; 220/230, 573.1, 574, 574.1, 574.2, 574.3, 220/575, 912
See application file for complete search history.

(56) References Cited

U.S. PATENT DOCUMENTS

| 4,605,498 A | 8/1986 | Kulish |
| 4,872,401 A * | 10/1989 | Lee ................................ 99/275 |
| 5,024,759 A | 6/1991 | McGrath et al. |
| 5,297,694 A | 3/1994 | Bontemps |
| 5,527,105 A | 6/1996 | Riach, Jr. |
| 5,705,215 A | 1/1998 | Riach, Jr. |
| 5,746,119 A * | 5/1998 | Matsumoto ..................... 99/451 |
| 6,390,319 B1 | 5/2002 | Yu |
| 6,599,419 B2 * | 7/2003 | Hagans ......................... 210/222 |
| 6,707,362 B1 | 3/2004 | Adam et al. |
| 6,959,640 B2 * | 11/2005 | Flick ............................ 99/277.1 |
| 6,960,292 B2 * | 11/2005 | Xujiang et al. ............... 210/149 |

FOREIGN PATENT DOCUMENTS

| CN | 1090147 | 12/1993 |
| CN | 2481656 Y | 3/2002 |
| DE | 3035914 | 12/1981 |
| EP | 0633436 | 1/1995 |
| EP | 1029481 A1 | 1/1997 |
| EP | 1029481 A2 | 8/2000 |
| FR | 2109318 | 5/1972 |

(Continued)

OTHER PUBLICATIONS

"The experimental Research about Some Fruits and Vegetables Keeping Fresh in Magnet" by Liu Jianhong, pp. 64-65, edition 6, 19th volume, Journal of Yunnan Normal University, Dec. 1999.

(Continued)

*Primary Examiner* — Reginald L Alexander
(74) *Attorney, Agent, or Firm* — Larson & Larson, P.A.; Frank Liebenow

(57) ABSTRACT

A method and device for treating a perishable object, the method exposing the perishable object to a south magnetic field created by magnetic interference of a plurality of magnets. The device comprising a panel defining a portion of a space for containing the perishable object, the plurality of magnets housed within the panel and arranged such that the magnets extend into the space for containing the perishable object.

7 Claims, 15 Drawing Sheets

FOREIGN PATENT DOCUMENTS

| | | |
|---|---|---|
| FR | 2590165 A1 | 5/1987 |
| FR | 2636049 | 9/1990 |
| GB | 2333977 A | 11/1992 |
| GB | 2256091 A | 8/1999 |
| JP | 58071881 | 4/1983 |
| JP | 1-148175 * | 6/1989 |
| JP | 7274917 | 10/1995 |
| JP | 11144945 | 5/1999 |
| JP | 2001196220 | 7/2001 |
| JP | 2003-180240 | 7/2003 |
| JP | 2003180240 | 7/2003 |
| JP | 2005218547 | 8/2005 |
| WO | WO9210430 A1 | 6/1992 |
| WO | WO0015054 | 3/2000 |

OTHER PUBLICATIONS

State Intellectual Property Office of People's Republic of China office action dated Apr. 8, 2011.

* cited by examiner

| Distance away from magnet plane (mm) | Magnetic flux at center (X) of a 4pc-magnet arrangement in in-line arrangements | Magnetic flux at center of a 4pc-magnet arrangement in staggered for magnetic interference |
|---|---|---|
|  | 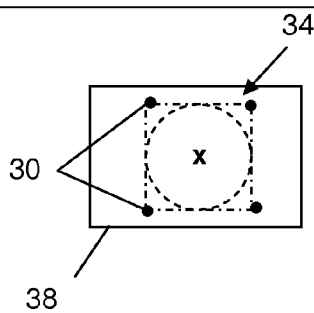 | 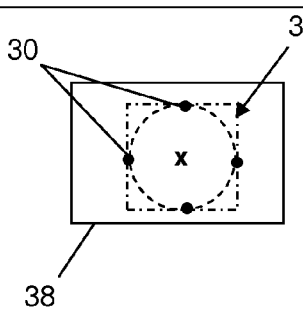 |
| 60 | 1300± 10G (Reference 100%) | 1700± 8G (w.r.t. Reference = 130%) |
Figure 4

| Conditions | Internal ambient temperature difference (with device minus without device), °C | Standard Deviation (1δ) |
|---|---|---|
| Experiment 1<br>With 1 kg ice cubes only | - 0.66 | 0.15 |
| Experiment 2<br>With 1 kg ice cubes and 1 kg fishes | - 1.24 | 0.15 |

| Environment Conditions | Types of samples tested | Duration of exposure | Observations: Exposed without using device of the present invention | Observations: Exposed using device of the present invention |
|---|---|---|---|---|
| Chilled (+0 to +4 °C) | 1. Sliced salmon fish # | 3 days[#1] 5 days[#2] | • Total plate count (salmon [#1]) = 71,000 cfu/g<br>• Total plate count (salmon[#2]) =1,000,000 cfu/g<br>• Total Colliform (salmon [#1]) = 21 count/g | • Total plate count (salmon [#1]) = 19,500 cfu/g<br>• Total plate count (salmon[#2]) =2,900,000 cfu/g<br>• Total Colliform (salmon [#1]) = 4 count/g |
| | 2. Tilapia fish (whole)<br><br>3. Prawns (Tiger and Grey prawns) | 8 days<br><br>6 days | • Appearance and texture of were dull and soft (for all)<br>• Cooked taste was less fresh (for all) | • Appearance and texture of were more firm and tender (for all)<br>• Cooked taste was better (for all) |
| Cooled (20 to 25°C) | 1. Sliced salmon[+] fish<br><br>2. Poultry | 4 hours<br><br>6 hours | • Total plate count (salmon[+]) = 49,000 cfu/g<br>• Change in TVN[+] = 6 mg/100g<br>• Foul smell (for all) | • Total plate count (salmon[+]) = 16,400 cfu/g<br>• Change in TVN[+] < 3 mg/100g<br>• No foul smell (for all) |
| Room (27 to 31°C) | 1. Soya bean drink<br><br>2. Oil-fried meals (e.g. fried rice and noodles)<br><br>3. Full cream milk* | 6 hours<br><br>6 hours<br><br>24 hours | • Pale aroma and taste<br><br>• Weak aroma and sour taste<br><br>• Total plate count (full cream milk*) = 5,000 cfu/ml | • Fresh cool taste and aroma<br><br>• Fresh aroma and tasted close to original condition<br><br>• Total plate count (full cream milk*) = 800 cfu/ml |

MAGNETIC DEVICE AND METHOD FOR TREATING PERISHABLE ITEMS SUCH AS FOOD OR ICE

PRIOR APPLICATIONS

This application is a continuation-in-part of international application no. PCT/SG2006/000018, filed on Feb. 1, 2006, which in turn bases priority on Singapore application no. 200500535-0, filed on Feb. 1, 2005.

BACKGROUND OF THE INVENTION

1. Field of the Invention

The present invention relates to a device and method for treating a perishable object.

2. Description of the Prior Art

Conventional methods and devices to keep food and beverages fresh and natural, particularly in the raw, semi-processed and processed states, typically involve thermal treatments, mainly by refrigeration. However, such devices are usually operated by electricity, which may not be available in some circumstances. Further, keeping food in a low temperature environment, such as a refrigerator, may also result in dehydration of the food.

In the decomposition of all living cells, such as in fish and meat products, there are several chemical and biochemical processes taking place. These processes include: (1) enzymatic spoilage that is caused by the tissue enzymes of the fish or meat itself; (2) oxidative deterioration that results in foul, rancid odors and color changes; (3) spoilage due to bacterial growth from its secondary products, primarily from the enzymes that cause the decomposition of proteins. These chemical-related deterioration processes are conventionally controlled by the reduction of ambient temperature by means of refrigeration processes. However, such refrigeration devices require electrical supply, which may not be available in some circumstances.

Further, even if refrigeration devices are available, it may be desirable to help prolong and/or enhance the freshness of food and beverages stored in a refrigerator for a longer period of time and to retain moisture of the food.

SUMMARY OF THE INVENTION

An object of the present invention is to provide a method of treating a perishable object, the method exposing the perishable object to a south magnetic field created by magnetic interference of a plurality of magnets.

The plurality of magnets may be arranged in a substantially staggered arrangement, and can be permanent or electromagnets. The method could provide for shielding the north-pole side of the magnets.

The perishable object may comprise a food item, a beverage item, or both, and the exposure maintains the freshness of the food item, the beverage item, or both. The perishable object may also comprise ice used to cool another perishable object.

The exposure may control a surface temperature of the perishable object, the rate of bacterial growth, the rate of dehydration or the rate of melting of the perishable object.

The duration of said exposing step may be chosen such that the rate of bacterial growth is reduced or increased compared to a rate without said exposure.

Another object of the present invention is to provide a device for treating a perishable object, the device comprising a panel defining a portion of a space for containing the perishable object, a plurality of magnets housed within the panel and arranged such that a south magnetic field created by magnetic interference of the plurality of magnets extends into the space for containing the perishable object.

The device could be composed of a six sided container, a tray, a plate, or a five sided container.

The device comprising a shielding unit consisting of a magnetic plate disposed at a north-pole side of the magnets housed in each panel.

The device further comprising protective padding disposed around the magnets.

The magnets sealed within the panels may be permanent or electromagnets.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 4 illustrates a table showing the comparison of magnetic flux from an in-line arrangement of four magnets as compared to a staggered arrangement of the four magnets;

FIG. 15(a) illustrates a thermal image of a cooler box containing ice cubes and placed in a device according to an embodiment of the present invention;

FIG. 15(b) illustrates a thermal image of a cooler box containing ice cubes without a device according to an embodiment of the present invention;

FIGS. 15(c) and 15(d) illustrate thermal images of the contents of the cooler boxes shown in FIGS. 15(a) and 15(b);

FIG. 18 shows a table illustrating experimental results for subjecting perishable food under different environmental conditions with or without a device according to one or more of the embodiments of the present invention.

DETAILED DESCRIPTION OF THE PREFERRED EMBODIMENT

The described embodiments relate to a method and device to reduce the rate of chemical and biochemical activities that cause the denaturing and decomposition of perishable objects, such as food and beverages. The device and method also function to retain the moisture content in food by maintaining cell hydration, which can be particularly useful for food such as cooked rice, bread, cheese, cold-cut ham, and ice.

Figure 1:
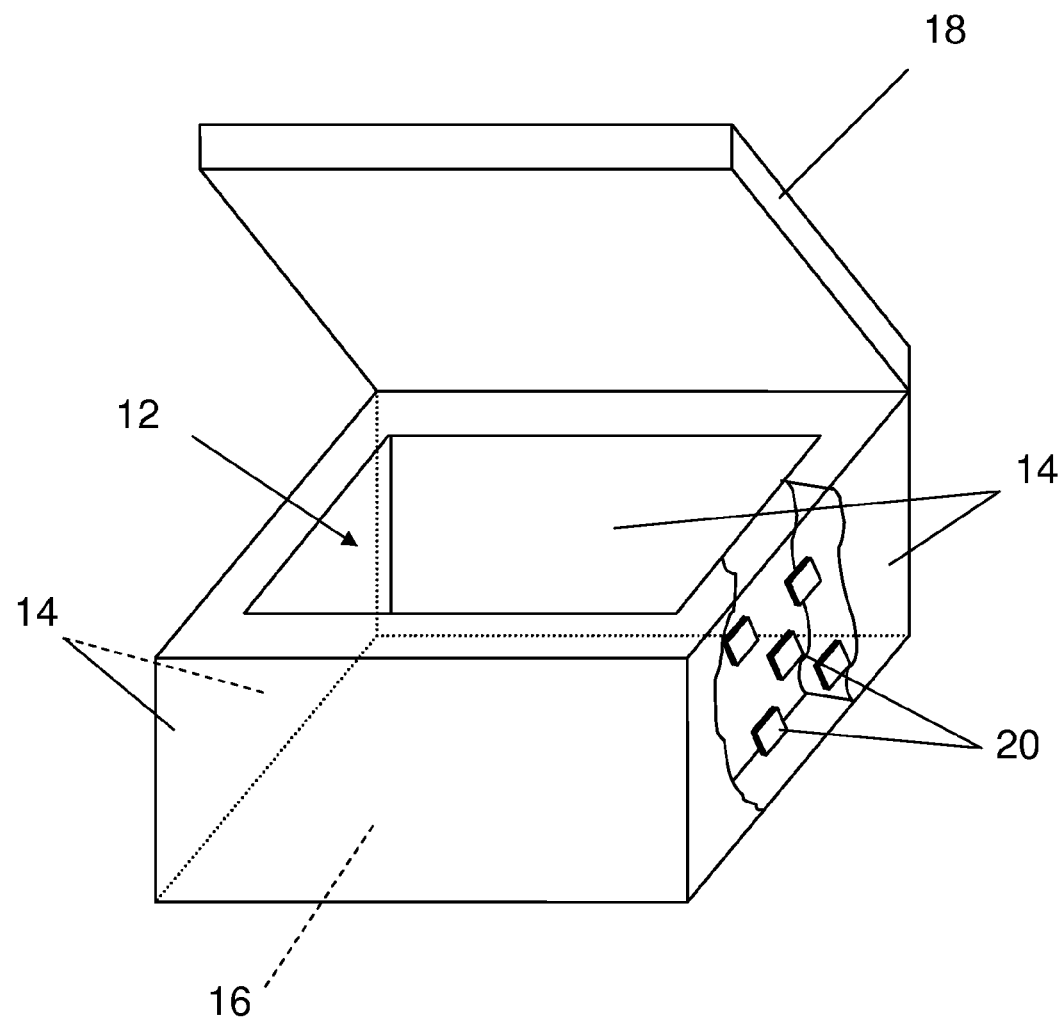
FIG. 1 illustrates a schematic perspective view of a device according to a first embodiment of the present invention.

FIG. 1 illustrates a magnetic device in accordance with a first embodiment of the present invention. The device comprises a substantially rectangular shaped container 10 having a cavity 12 defined by six panels, namely, four side panels 14, a base panel 16 and a top panel 18. The top panel 18 acts as a cover or lid of the container 10. Each of the panels 14, 16, 18 houses a plurality of magnets 20 within the panel. The four side panels 14, the base panel 16, and the top panel 18 are configured to envelop an object (not shown), for example, perishable food. The object is placed in the cavity 12 of the container 10 such that the object is surrounded by the panels 14, 16, 18 in all three linear axes, namely the x, y, and z-axes.

Each of the plurality of magnets 20 are housed within the panels 14, 16, 18 with their respective south-pole side (refer to FIG. 4) facing towards the object placed in the cavity 12 of the container 10, such that a magnetic south field is directed upon the object. Further, since the object is surrounded by the panels 14, 16, 18, this ensures that the targeted object is only exposed to the magnetic south field in all three axes.

There are two polarities and directions in a magnetic field. One direction is from the north magnetic pole and the other direction is from the south magnetic pole. Based on scientific convention, the compass "north" needle points in the direction of the magnetic flux, that is, in an outward direction from a magnet's north pole end, and inward at the magnet's south pole end.

The magnets 20 are permanent magnets in the referenced embodiment. It should be appreciated that the material, size and shape of the permanent magnets 20 may vary, depending on design and application. Further, the number of magnets 20 used may vary depending on e.g. the shape and size of the container 10, for example. The magnets 20 may also be in the form of electromagnets instead of permanent magnets.

Figure 2:
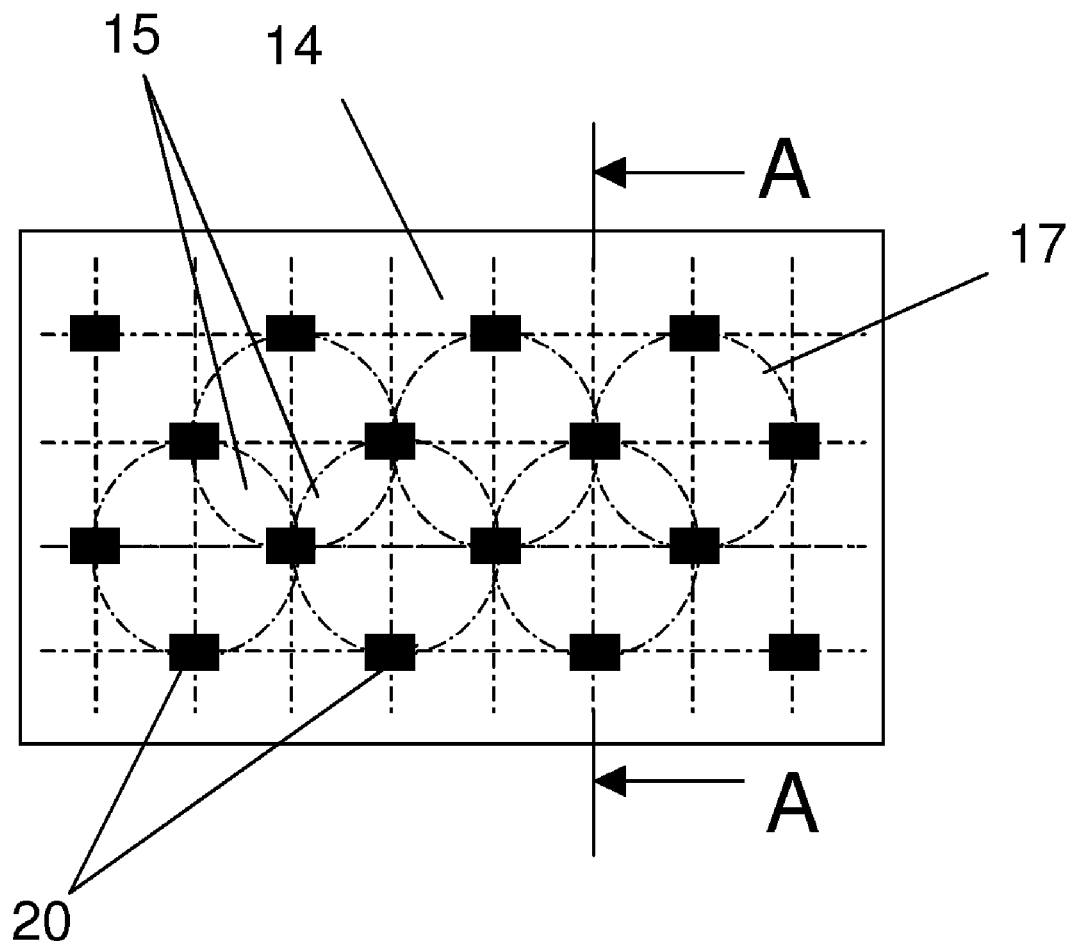
FIG. 2 illustrates a schematic view of the arrangement of magnets housed in a side panel of the device shown in FIG. 1.

FIG. 2 illustrates a schematic view showing the arrangement of the plurality of magnets 20 housed in one of the four side panels 14 of the container 10 shown in FIG. 1. The magnets 20 are arranged such that nearest neighboring circles 17 of magnets 20 are substantially in a staggered arrangement with substantially uniform spacing between the magnets 20 within the side panel 14 to produce magnetic interference 15, which in turn enhances magnetic field strength. Magnetic interference significantly increases the total propagated magnetic field (in this case the south magnetic field). Since magnetic interference increases the strength of the magnetic field, the size of the magnets and/or the number of magnets required to achieve a desired magnetic field strength is reduced. This in turn reduces the total weight and the cost of the device. The magnets 20 in the base panel 16 and top panel 18 (shown in FIG. 1) are arranged in a similar staggered arrangement as described above.

Figure 3:
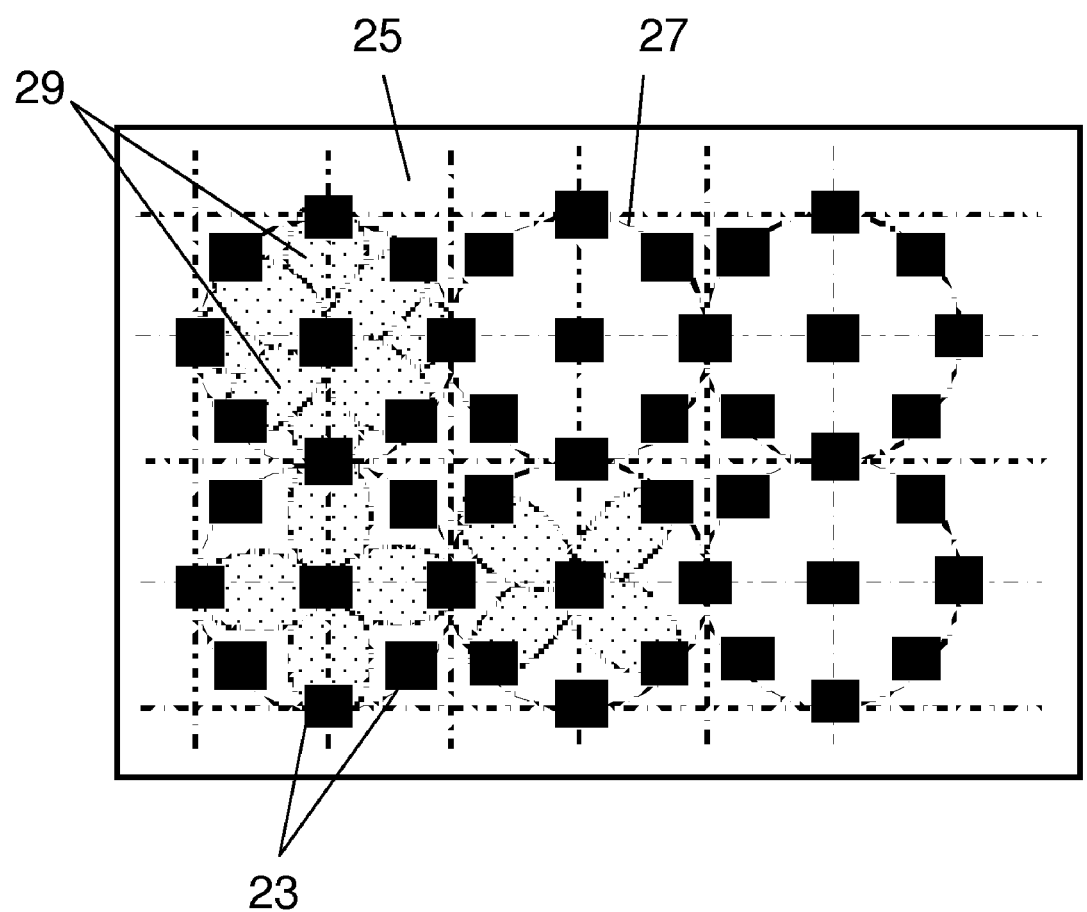
FIG. 3 illustrates a schematic view of the arrangement of magnets housed in a side panel of a device according to a second embodiment of the present invention.

FIG. 3 illustrates a schematic view of the arrangement of a plurality of magnets 23 housed in the panel 25 of the device according to a second embodiment. In this embodiment, the magnets 23 are arranged in a substantially staggered arrangement having a circular configuration 27 with a magnet 23 in the center of each of the circles 27 of magnets 23 to produce magnetic interference 29, thereby enhancing the magnetic field strength.

FIG. 4 illustrates a table showing the comparison of magnetic flux from an in-line arrangement 34 of four magnets 30 and a substantially staggered arrangement 36 of the four magnets 30. Schematic plan views of the positions of the magnets 30 in the in-line arrangement 34 and the substantially staggered arrangement 36 are shown in the first and second rows of the table, respectively. The positions of the magnets 30 are represented by dots "•" and the center of the arrangement of the magnets 30 are represented by a cross "X". The magnetic flux is measured from the center of each arrangement 34, 36, about 60 mm away from a magnetic plane 38. The magnetic flux at the center of the staggered arrangement 36 (magnetic flux of 1700±8 G) is greater compared to the magnetic flux at the center of the in-line arrangement 34 (magnetic flux of 1300±10 G). This shows an enhancement of the magnetic field strength and propagation of the magnetic field of the staggered arrangement 36 over the in-line arrangement 34.

Figure 5:
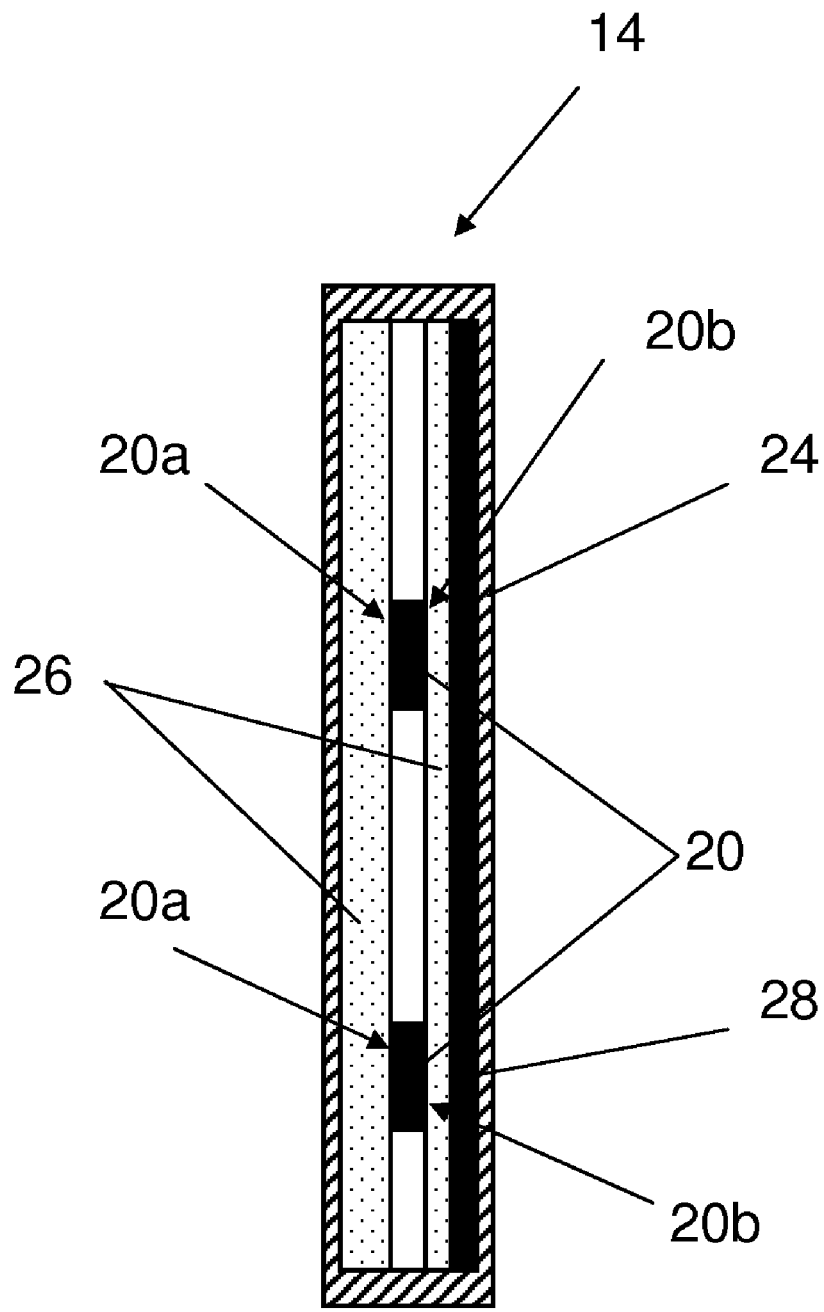
FIG. 5 illustrates a schematic cross-sectional view of the side panel of FIG. 2 along line A-A.

FIG. 5 is a cross-sectional view of the side panel 14 of FIG. 2 along line A-A. The side panel 14 comprises a casing 24. The magnets 20 are housed within the casing 24. Protective padding 26 is disposed on a south-pole side 20a and a north-pole side 20b of the magnets 20. The protective padding 26 acts as a spacer, heat insulator and shock absorber for the magnets 20. The north-pole side 20b of the magnets 20 is shielded by a magnetic shielding device 28 in the form of, for example, a shield plate. The shield plate 28 is disposed between the protective padding 26 on the north-pole side 20b of the magnets 20 and the casing 24. The protective padding 26 may be made of materials such as neoprene based foam tape, which is structurally stable and offers good moisture and fungus resistance properties. The thickness of the protective padding 26 depends on the magnetic field strength of the magnets 20 used. The protective padding 26 also serves to provide the necessary spacing between the magnets 20 and an outer surface of the casing 24, such that the magnetic field strength on the outer surface of the casing 24 is not too large to attract any ferromagnetic objects.

The shield plate 28, the protective padding 26 and the magnets 20 are sealed within the casing 24. This is to ensure that the magnets 20, the protective padding 26 and the shield plate 28 are insulated. The top and base panels, 16, 18 of the container 10 (see FIG. 1) are configured in a similar manner as described above.

The shield plate 28 may be made of any ferromagnetic material, such as low cost tin sheets, which comprise iron (Fe) mixed with tin (Sn). The composition and thickness of the shield plate 28 may vary, but the magnetic saturation value of the material used for the shield plate 28 should be higher than the external magnetizing field strength, which depends on the type and size of the permanent magnets 20 used.

The material used for the casing 24 may be any non-magnetic material, especially for the portion of the casing, for example, polyethylene and polypropylene, which are chemically and structurally stable and also food safe. The materials are durable against wear, high temperatures and washing by detergents. The thickness of the material used for the casing 24 may be sufficient to prevent deformation from rough handling and protect the magnets 20 from damage.

In the embodiment of FIG. 1, the device 10 is in the form of a closed rectangular container, with six panels 14, 16, 18. However, the device may be designed in various other forms.

Figure 6:
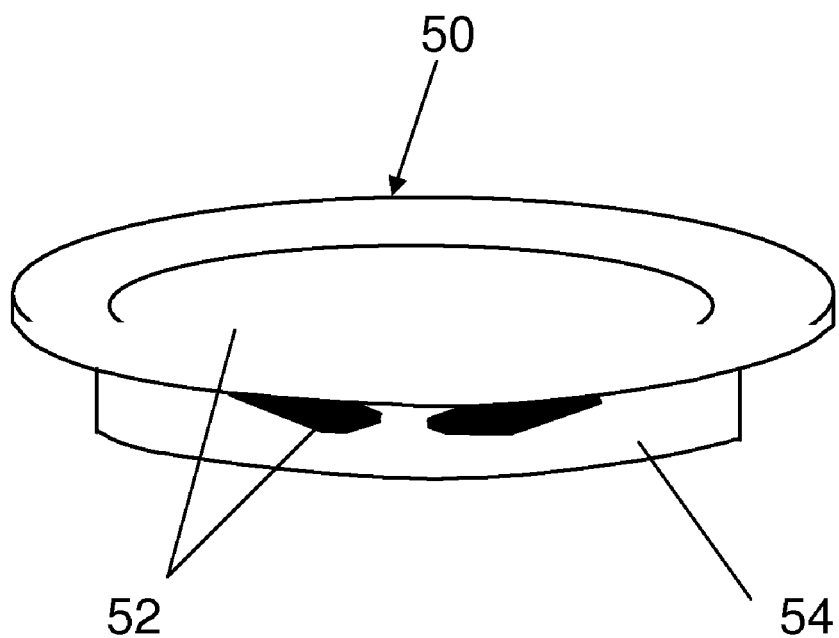
FIG. 6 illustrates a schematic view of the device according to a third embodiment of the present invention.

For example, a third embodiment illustrated in FIG. 6, shows the device 50 is in the form of a plate. A plurality of magnets 52 is disposed in a staggered arrangement in a base panel 54 of the plate 50. The plate 50 may be used in buffets and catering applications to display ready-to-eat food and at the same time maintain the freshness of the food.

Figure 7:
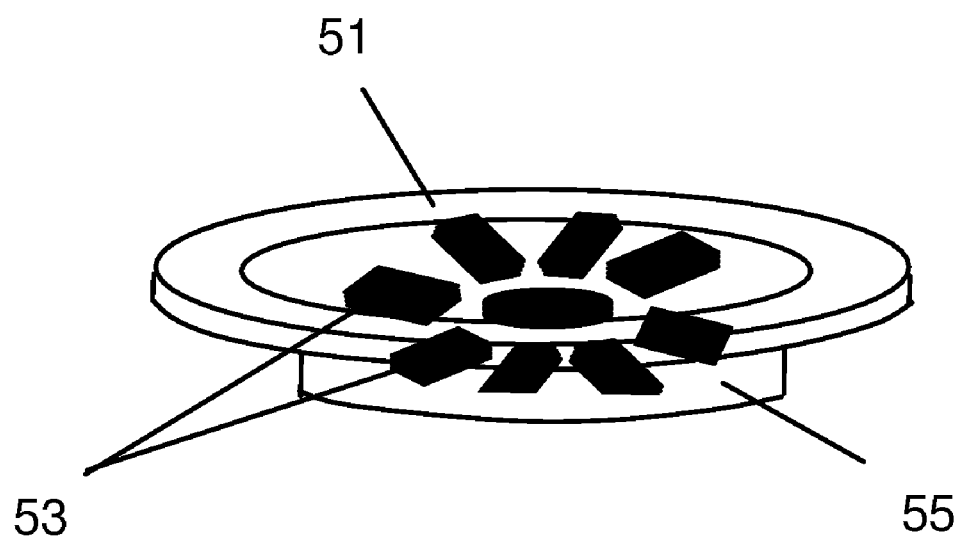
FIG. 7 illustrates a schematic view of the device according to a fourth embodiment of the present invention.

FIG. 7 illustrates a fourth embodiment showing another staggered arrangement of the plurality of magnets 53 in the base panel 55 of the device 51 in the form of a plate. In this embodiment, the magnets 53 are arranged in a circular configuration having a magnet 53 in the center of the circular configuration to produce magnetic interference.

Figure 8:
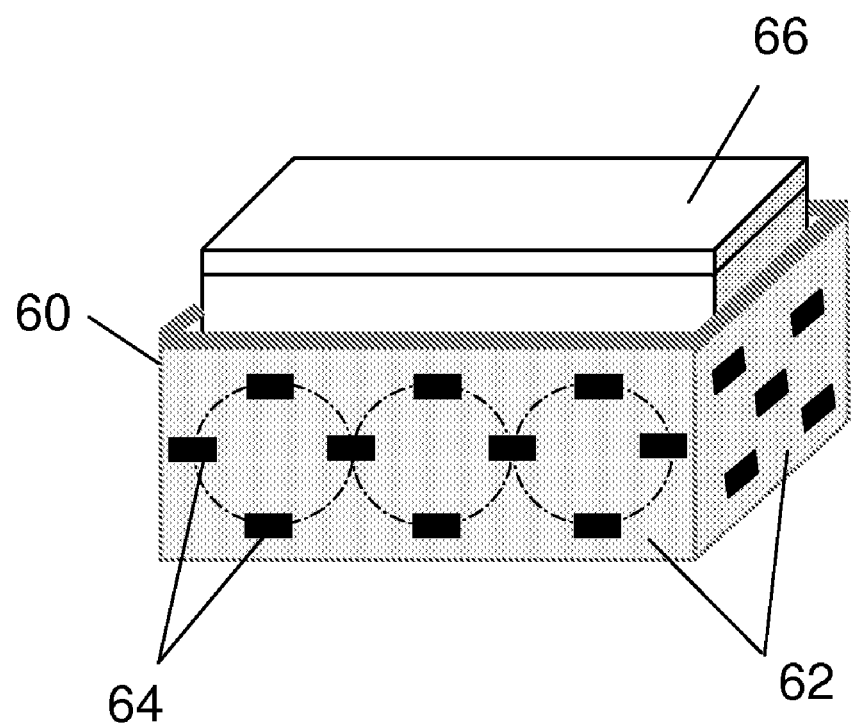
FIG. 8 illustrates a schematic view of the device according to a fifth embodiment of the present invention.

FIG. 8 illustrates a fifth embodiment whereby the device 60 may be in the form of an open container comprising five panels 62. Similarly, each of the panels 62 houses a plurality of magnets 64 disposed in a staggered arrangement. A cooler box 66 may be placed in the container 60 for use outdoors, such as for picnics and fishing, to keep food chilled.

Figure 9:
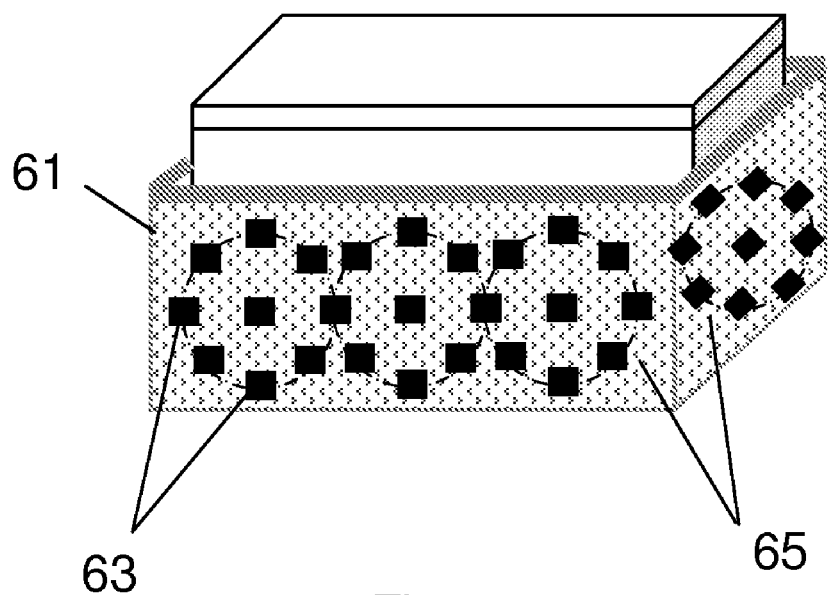
FIG. 9 illustrates a schematic view of the device according to a sixth embodiment of the present invention.

FIG. 9 illustrates a sixth embodiment of another staggered arrangement of a plurality of magnets 63 within each panel 65 of the open container 61. In this embodiment, the magnets 63 are arranged in a circular configuration having a magnet 63 in the center of the circular configuration to produce magnetic interference.

Figure 10:
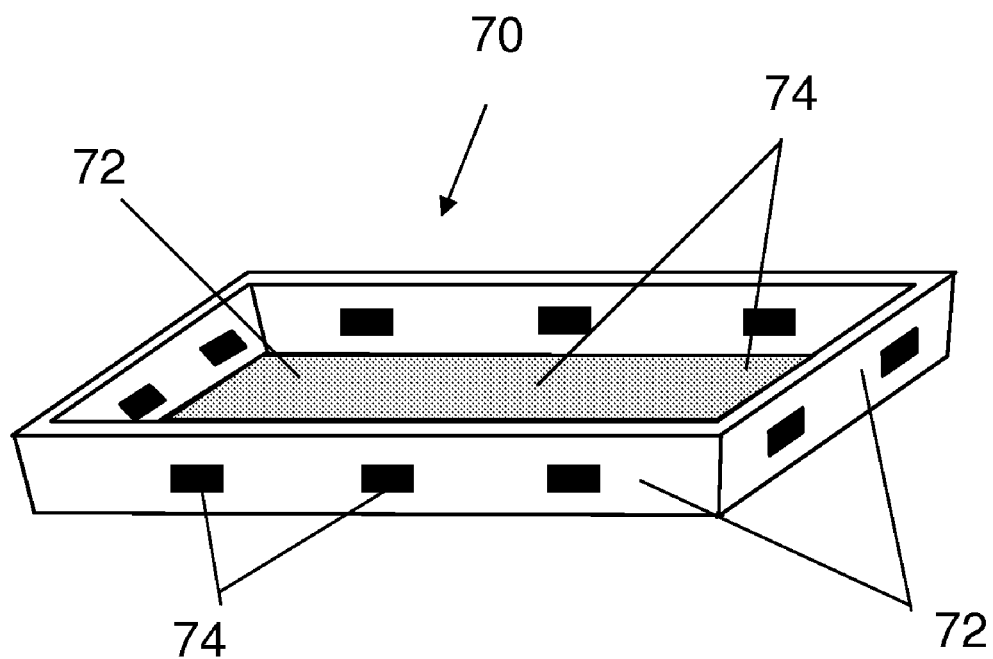
FIG. 10 illustrates a schematic view of the device according to a seventh embodiment of the present invention.

In a seventh embodiment, as shown in FIG. 10, the device 70 may be in the form of a tray. Each of the panels 72 forming the sides and the base of the tray 70 houses a plurality of magnets 74, as described earlier. The tray 70 may be used to contain ready-to-eat food, such as bread and cooked food.

Figure 11:
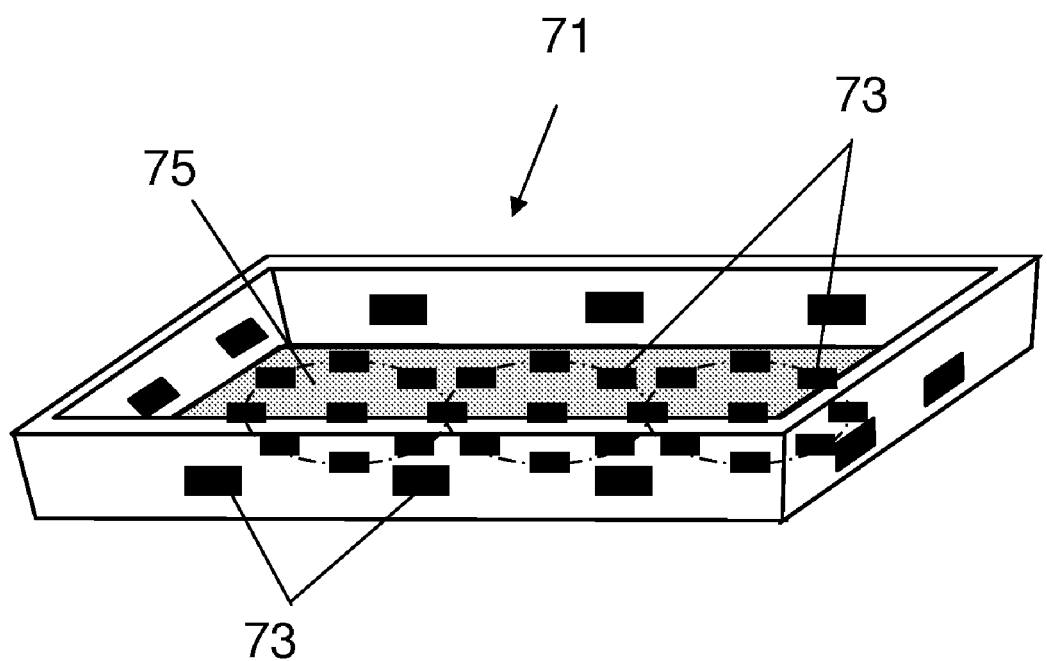
FIG. 11 illustrates a schematic view of the device according to an eighth embodiment of the present invention.

FIG. 11 illustrates an eighth embodiment of a staggered arrangement of a plurality of magnets 73 within a panel 75 forming the base of the tray 71. In this embodiment, the magnets 73 are housed within the panel 75 forming the base of the tray 71, and are arranged in a circular configuration having a magnet 73 in the center of the circular configuration to produce magnetic interference.

Figure 12:
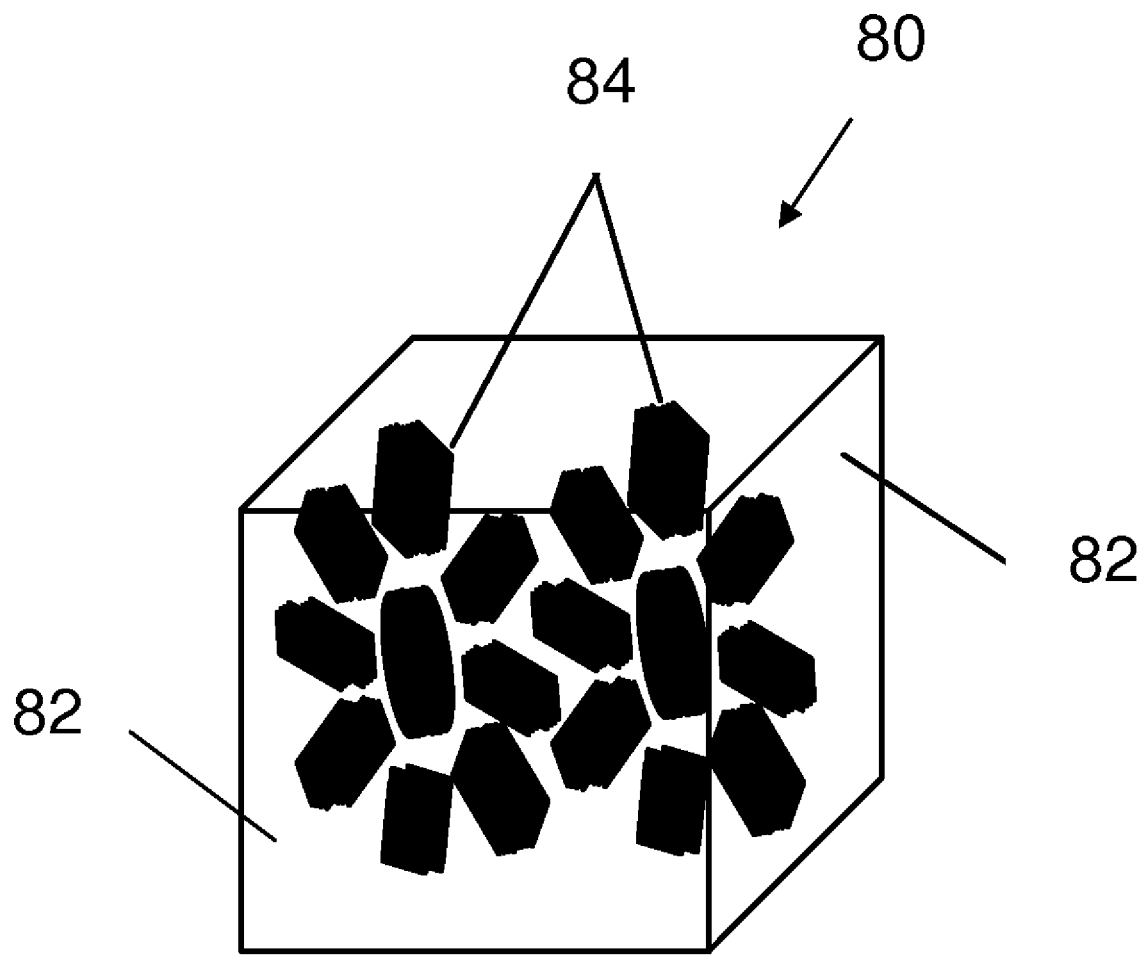
FIG. 12 illustrates a schematic view of the device according to a ninth embodiment of the present invention.

In a ninth embodiment as shown in FIG. 12, the device 80 may be in the form of a block comprising six panels 82. A plurality of magnets 84 disposed in a staggered arrangement are housed within the panels 82. The plurality of magnets 84 are arranged at various respective tilt angles to project a substantially three-dimensional magnetic field into space(s) adjacent one or more of the panels 82. The device 80 may be placed in, for example, a refrigerator or in an open environment such that the projected magnetic field extends into the space(s) adjacent one or more of the panels 82 containing the perishable objects to maintain the freshness of the perishable objects.

Figure 13:
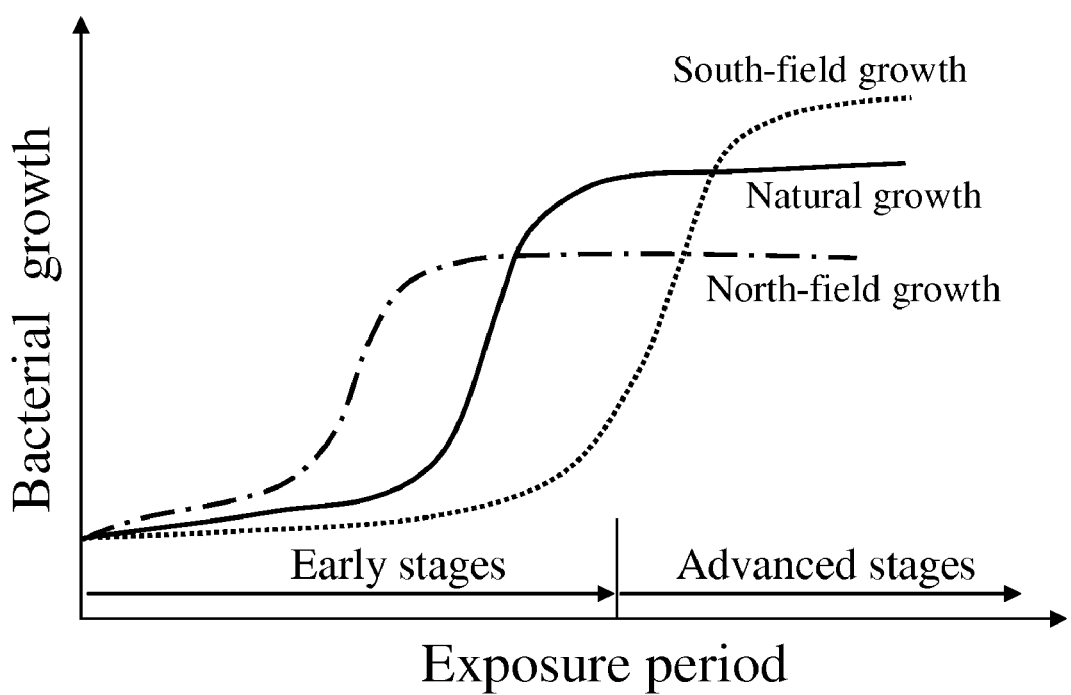
FIG. 13 shows a graph of bacterial growth against exposure time of food samples.

FIG. 13 illustrates a graph, based on experimental results, showing bacterial growth against exposure period of food samples exposed to the north magnetic field, the south magnetic field, and without any magnetic field. Comparing the curves of the south magnetic field growth curve and the north magnetic field growth curve, during early stages of exposure, for example, within 1-3 days for seafood in seafood in (about 0° C.~4° C.) chiller environment, the rate of bacterial growth is higher for food samples exposed to the north magnetic field compared to samples exposed to the south magnetic field. Also, this difference in the rate of bacterial growth is found to be greater when magnetic interference is applied. By using magnetic interference from the south magnetic field, it was found that there is a significant reduction in biochemical and chemical reactions during the early stages of exposure, which causes a delay in the food denaturing process. As a result of the reduced biochemical and chemical reactions, the overall quality of foods exposed to the interfered south magnetic field can be maintained longer than foods that are not exposed to any magnetic field or foods exposed to the north magnetic field.

The duration of early stages of exposure depends on the condition and type of food and beverages, and storage conditions such as ambient temperature. For example, the early stages for a processed fish stored in chiller conditions (about 0° C.~4° C.) may be 1 to 3 days, whereas at room temperature conditions (about 20° C.~25° C.) may be 2 to 4 hours.

In addition, it was found that in example embodiments the mechanism of maintaining the freshness in food and beverages is due to the reduction of energy state in electrons in atoms and molecules. By using the magnetic south field, the energy state of the electrons is reduced. This, in turn, reduces the vibration energy of the electrons, and hence, creates an energy barrier that prevents electron transfer which is required for any biochemical or chemical reactions to occur. Thus, the rate of chemical and biochemical deterioration activities that cause the decomposition of food and beverages can be slowed down or reduced, thereby maintaining the freshness of the food and beverages.

Experiments were conducted to monitor the temperature differences of various objects, such as melting ice cubes and deteriorating beverages and foods. Differences in the temperature of an object that is exposed to the South magnetic field and the temperature of the object without exposure to a magnetic field were observed. The difference in temperature indicates the relative energy state of the object, for example, and influences the rate of ice melting (from solid to liquid state) and changes in chemical and biochemical reactions for deteriorating food.

Figure 14:
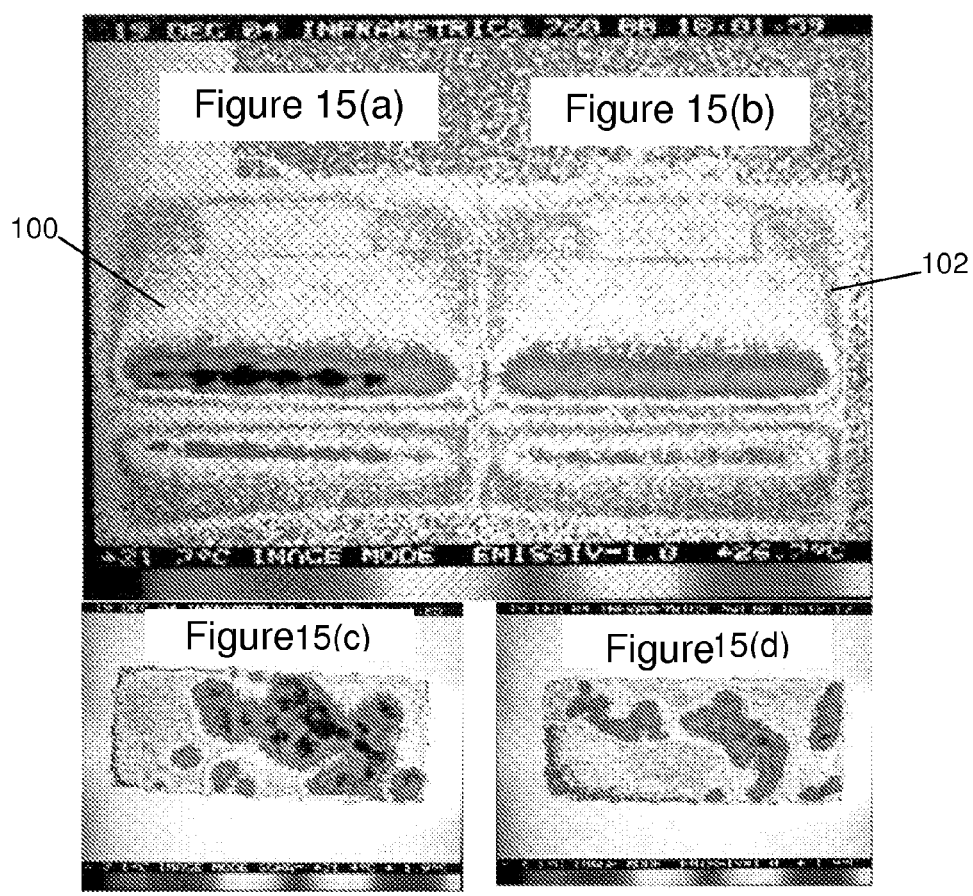
FIG. 14 shows a graph for experimental results of average internal ambient temperature differences with and without a device according to an embodiment of the present invention.

The table illustrated in FIG. 13, shows experimental results of average internal ambient temperature differences with and without a device. The cooler boxes that are placed in the device are exposed to a south magnetic field, while the cooler boxes without the device are not subjected to any magnetic field. In this experiment, the device used is a five-panel container substantially similar to the device 60 shown in FIG. 8. In Experiment 1, 1 kg of ice cubes is placed in the cooler boxes. In Experiment 2, 1 kg of ice cubes and 1 kg of fishes (comprising 10 whole fishes of approximately 100 g each) are placed in the cooler boxes. The experimental results shown in FIG. 14 illustrate one of the observable temperature effects when objects are continuously undergoing physical and chemical changes. For example, the ice cubes kept in the 25 liter cooler box that gradually melts over a time period of 24 hours, and similar ice cubes with an additional load of whole fishes that are gradually melting and deteriorating with time, respectively. In both Experiment 1 and Experiment 2, the difference in the average internal ambient temperatures between the cooler boxes placed in the device and the cooler boxes without the device are negative (i.e. the internal ambient temperature of the cooler boxes placed in the device is lower). The standard deviation for both Experiment 1 and Experiment 2 is about 0.15.

The results observed in the table of FIG. 14 demonstrate that the south magnetic field is able to reduce the total energy state in the melting ice, such that gaining of heat from the environment by the ice to cause the melting process is slowed. With the additional load into the cooler box (for this case, the whole fishes), the effect on the melting ice and deteriorating fish gave rise to higher internal ambient temperature differences (i.e. −1.24° C. compared to −0.66° C.). The lower temperatures observed in the cooler boxes that were exposed to the south magnetic field demonstrate the effect on the reduction of the rate of heat transfer and absorption in melting ice, and also the ability to lower the chemical and biochemical reactions that generate additional heat during the fish decomposition process.

FIGS. 15(a) and 15(b) are thermal images of a cooler box 100 containing ice cubes that are placed in a device according to the embodiments of the present invention (i.e. exposed to magnetic south field), and a cooler box 102 containing ice cubes without the device (i.e. not exposed to any magnetic field), respectively. The device used is a five-panel open container substantially similar to that described earlier in FIG. 8. A thermal image analysis provides further evidence to the above explanation on the reduction of energy state. Regions of darker shades in the thermal images represent areas of lower temperatures. The cooler box 100 that is exposed to a south magnetic field has more distinct darker regions compared to the cooler box 102 that was not exposed to any magnetic field.

FIGS. 15(c) and 15(d) are thermal images of the contents of the cooler boxes 100, 102 described above, respectively. The thermal images were obtained after 10 hours of storage in a room environment (28° C.~31° C.). The remaining ice cubes (represented by the darker shaded regions) in the cooler boxes 100, 102 show that more ice cubes remained in solid form when the ice cubes are exposed to the South magnetic field (FIG. 15(c)) compared to the ice cubes that were not exposed to any magnetic field (FIG. 15(d)).

Figure 16A:
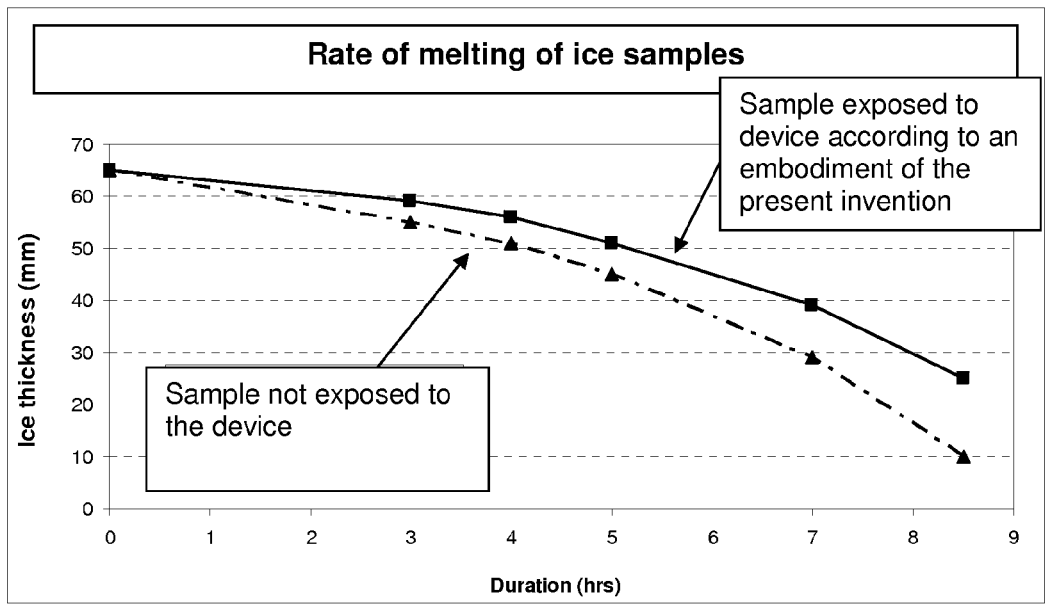
FIG. 16(a) shows a graph of ice thickness against duration of ice samples.

FIG. 16(a) illustrates a graph, based on experimental results, showing ice thickness against duration of an ice sample exposed to a device according to an embodiment of the present invention (i.e. exposed to a south magnetic field) and another ice sample not exposed to the device (i.e. not exposed to any magnetic field). In this experiment, the rate of ice melting is determined by the decrease in thickness of the ice samples over time. Crushed ice samples are compacted to 65 mm thick ice beds and placed on perforated plastic trays. The device is placed at the bottom of one of the trays. The ice sample on the tray with the device is exposed to the south magnetic field, while the ice sample on the tray without the device is not exposed to any magnetic field. It is observed that the decrease in thickness of the ice sample on the tray with the device is smaller compared to the decrease in thickness of the ice sample on the tray without the device.

Figures 16B, 16C:
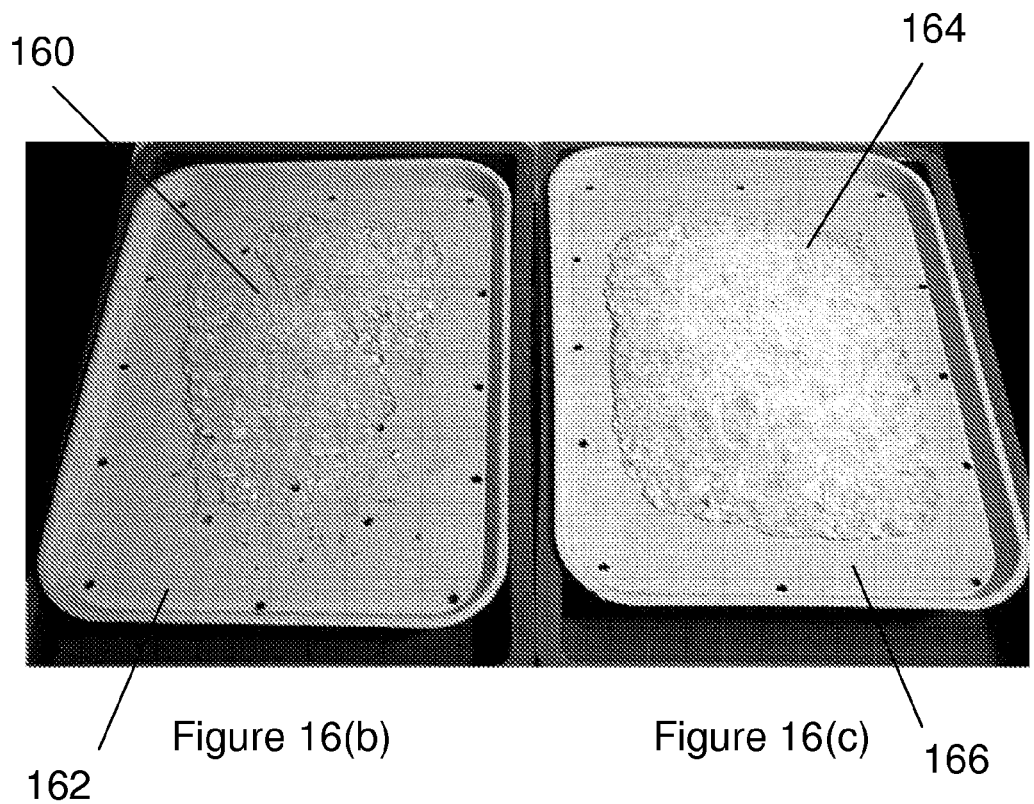
FIGS. 16(b) and 16(c) illustrate photographic representations of the ice samples shown in FIG. 16(a)

FIGS. 16(b) and 16(c) are photographs of the ice sample 160 on the tray 162 without the device and the ice sample 164 on the tray 166 with the device, respectively. The photographs were taken after 8.5 hours of keeping the ice samples 160, 164 in an air conditioned (20° C.~23° C.) environment. It is observed that the thickness of the remaining ice sample 164 on the tray 166 with the device is about 38.5% with respect to the initial thickness of ice and the thickness of the remaining ice sample 160 on the tray 162 without the device is about 15.4% with respect to the initial thickness of ice. Thus, the thickness of the remaining ice sample 164 on the tray 166 with the device is about 23% greater that the thickness of the remaining ice sample 160 on the tray 162 without the device.

By exposing ice to a south magnetic field, the rate of ice melting is slower compared to ice that is not exposed to any magnetic field.

The embodiment of the device described above is able to reduce the rate of melting of a perishable object, in particular, ice. It should be appreciated that since the rate of melting of ice can be reduced, the ice may in turn be utilized to cool another perishable object, for example, raw fish, sushi, etc., and thus, maintains the freshness of the other perishable object. It should also be appreciated that the cooling of the other perishable object as a result of the reduction in the rate of melting of ice may be in addition to the device directly maintaining the freshness of the other perishable object. The device may be in the form of a tray on a display counter in a supermarket displaying food items such as raw fish. A bed of ice is placed on the tray and the raw fish is then placed on the bed of ice.

Figure 17:
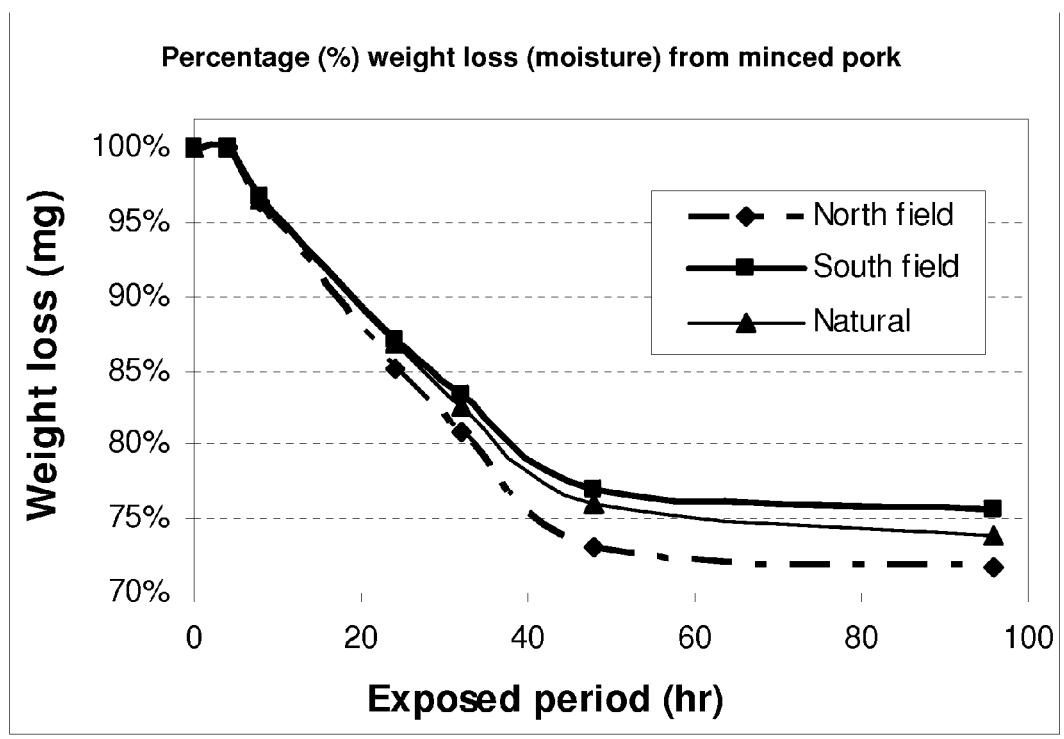
FIG. 17 shows a graph of weight fluctuations from moisture loss of minced pork against exposed periods of time.

FIG. 17 illustrates a graph, based on experimental results, showing percentage (%) weight lost against exposure period of minced pork samples exposed to a magnetically interfered north magnetic field, a magnetically interfered south magnetic field, and without any magnetic field. The rate of water evaporation (i.e. rate of dehydration) from the minced pork can be determined by the change in percentage weight loss of the minced pork over time. It is observed that the water evaporation rate from the minced pork exposed to the south magnetic field is reduced when compared to the minced pork samples exposed to the north magnetic field and the minced pork samples not exposed to any magnetic field. On the other hand, the water evaporation rate from the minced pork sample exposed to the north magnetic field is accelerated when compared to the minced pork samples exposed to the south magnetic field and the minced pork sample not exposed to any magnetic field.

From the experiment above, it can be observed that the rate of dehydration of the minced pork samples that are exposed to the south magnetic field is slower compared to minced pork samples that are exposed to the north magnetic field and minced pork samples that are not exposed to any magnetic field. The maintenance of hydration (i.e. lower rate of dehydration) of perishable objects, for example, the minced pork samples described above, contribute to maintaining the overall quality of the perishable objects for a longer period of time compared to perishable objects that are not exposed to any magnetic field or perishable objects that are exposed to the north magnetic field.

The phenomenon of a relatively colder surface temperature on objects that are undergoing changes, such as heat absorption (in the case of melting ice) or chemical and biochemical reactions (in the case of food deterioration) were consistently observed when the objects are exposed to the south magnetic field. Examples of such objects are beverages such as wine and soy bean drink, perishable foods such as raw fish, ice and inorganic materials such as iron bolts undergoing corrosion process. This effect results in the retention of water molecules within cells, thereby maintaining intracellular hydration and hence reduces the evaporation rate of moisture from the object, for example, in bread cooked rice, cheese, cold-cut ham, and minced pork.

However, due to the cellular hydration effect when food samples are exposed to the south magnetic field, it is observed that in the advance stages of exposure, for example, 3 to 5 days for processed fish in a chiller environment, the rate of bacterial growth is greater compared to samples exposed to the north magnetic field and samples not exposed to any magnetic field (see FIG. 13). As cell hydration is maintained, the bacterial cells present in the food samples may synthesize more surface proteins, which consequently promote bacterial cell growth at the advanced stages. As a result, the device in accordance with embodiments of the present invention may be further used for promoting specific bacterial cell cultures and its enzyme secretions for pharmaceutical and biotechnological applications.

FIG. 18 illustrates a table of the experimental results for subjecting perishable food under different environmental conditions with and without a device according to one or more embodiments of the present invention.

From the experimental results shown in FIG. 18, it was observed that the device of the embodiments of the present invention is able to maintain or prolong the freshness of food and beverages, particularly for highly perishable foods such as fish and seafood during the early stages. The total plate count, which indicates the total bacteria presented in food, was significantly less when the device is used. Similarly, for the total Colliform count which indicates other disease-causing bacteria which results primarily from human handling, was also significantly less when the device is used. The total volatile nitrogen (TVN) analysis provides an indication of the freshness of the food samples. The change in TVN of the food samples was less when the device is used. The rate of volatile nitrogen emission, for example ammonia gas, from raw sliced salmon deterioration was reduced as a result of exposure to the south magnetic field. In addition, the device in accordance with embodiments of the present invention is also able to retain the moisture content in foods. This is particularly useful for storing foods such as cooked rice and bread.

Figure 19:
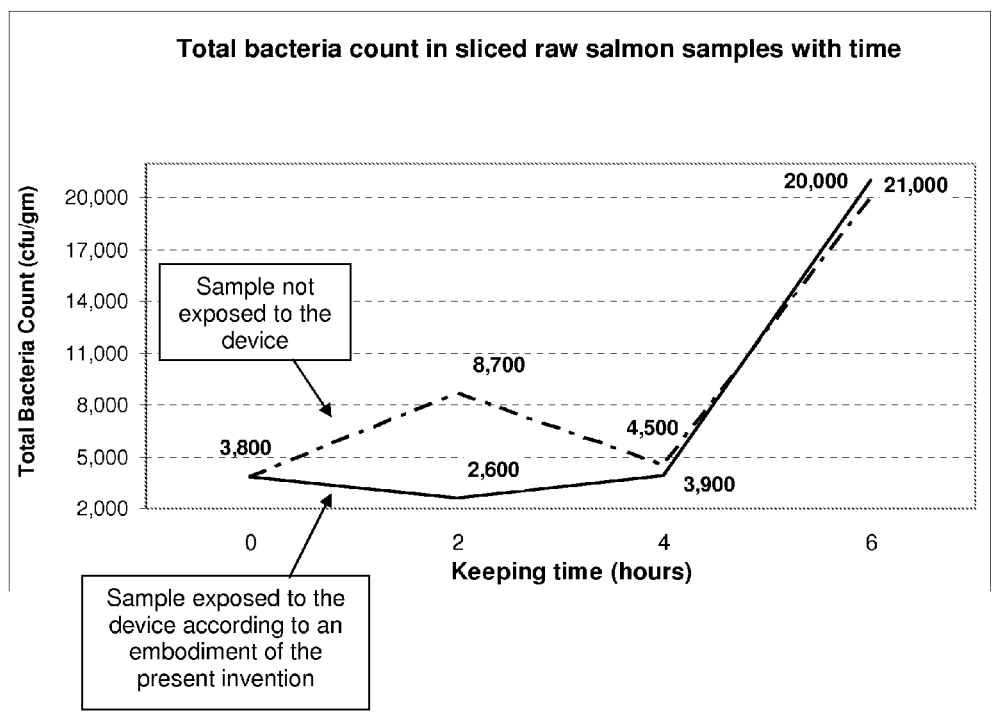
FIG. 19 shows a graph of total bacterial count for exposed sliced raw salmon over exposed periods of time.

FIG. 19 illustrates a graph, based on experimental results, of total bacteria count against keeping time of a sliced raw salmon sample exposed to a device of an embodiment of the present invention and a sliced raw salmon sample not exposed to the device. In this experiment, the sliced raw salmon samples are kept in a 30° environment and the bacteria count in the sliced raw salmon samples is measured every 2 hours over a 6-hour period. It is observed that the total bacteria count for the sliced raw salmon sample exposed to the device decreases in the first 2 hours of the experiment. On the other hand, it can be observed that the total bacteria count increases in the first 2 hours of the experiment for the sliced raw salmon sample not exposed to the device. At the end of 4 hours, the bacteria count in the sample exposed to the device is 100 cfu/gm more than the initial bacteria count, whereas the bacteria count in the sample not exposed to the device is 700 cfu/gm more than the initial bacteria count. After 4 hours, the bacteria growth in both samples begins to increase.

By exposing perishable objects to the device in accordance with one or more embodiments of the present invention, the onset of bacteria growth in the perishable object can be delayed, and as a result, the perishable object remains fresh for a longer period of time compared to perishable objects not exposed to the device.

In contrast to the conventional methods of maintaining freshness of foodstuffs, such as refrigeration, the device in accordance with the embodiments of the present invention does not require any electricity to function. This makes it mobile and very convenient for use outdoors and in places without electricity.

Further, the device in accordance with the embodiments of the present invention may be used in conjunction with a refrigeration device to maintain freshness of food or beverages, for example, the device may be in the form of a container that is placed into a refrigerator.

Conversely, instead of using the device for keeping food and beverages fresh at the early stages, the device of the present invention may also be suitable for promoting bacterial growth and protein synthesis by using the advanced stages. It can be observed from the graph in FIG. 8, and from the experimental results in FIG. 18 (for example, sliced salmon fish stored in a chiller after 5 days of storage) that in the advanced stages of exposure period the rate of bacterial growth is greater for specimens that are exposed to the magnetic south field.

It will be appreciated by a person skilled in the art that numerous variations and/or modifications may be made to the present invention as shown in the specific embodiments without departing from the spirit or scope of the invention as described. The present embodiments are, therefore, to be considered in all respects to be illustrative and not restrictive.

The invention claimed is:

1. A method for treating a perishable object, the method comprising:
   exposing the perishable object to a south magnetic field created by magnetic interference of a plurality of magnets;
   wherein the exposure controls a surface temperature of the perishable object or a rate of dehydration of the perishable object;
   wherein the plurality of magnets are selected from the group consisting of electromagnets and permanent magnets;
   wherein the exposure rate controls a rate of melting of the perishable object;
   wherein the perishable object comprises ice; and
   wherein the method further comprises utilizing the ice to cool another perishable object.

2. The method of claim 1, wherein the perishable object comprises a food item, beverage item or both, and the exposure maintains a freshness of the food item, beverage item, or both.

3. The method of claim 1, wherein the exposure rate controls a rate of bacterial growth on the perishable object.

4. The method of claim 1, wherein a duration of said exposing is chosen such that the rate of bacterial growth is reduced compared to a rate of bacterial growth without said exposing.

5. The method of claim 1, wherein the plurality of magnets are arranged in a substantially staggered arrangement.

6. The method of claim 1, wherein a north-pole side of the plurality of magnets are shielded by a magnetic shielding device.

7. A method for treating a perishable object, the method comprising:
   exposing the perishable object to a south magnetic field created by magnetic interference of a plurality of magnets;
   wherein the exposure controls a surface temperature of the perishable object or a rate of dehydration of the perishable object;
   wherein the exposure rate controls a rate of melting of the perishable object;
   wherein the perishable object comprises ice; and
   wherein the method further comprises utilizing the ice to cool another perishable object.

* * * * *